US010761310B2

(12) United States Patent
Bredno et al.

(10) Patent No.: US 10,761,310 B2
(45) Date of Patent: Sep. 1, 2020

(54) AUTO-FOCUS METHODS AND SYSTEMS FOR DIGITAL IMAGING USING MULTI-SPECTRAL TRAJECTORIES

(71) Applicant: Ventana Medical Systems, Inc., Tuscon, AZ (US)

(72) Inventors: Joerg Bredno, San Francisco, CA (US); Jim F. Martin, Mountain View, CA (US); Anindya Sarkar, Milpitas, CA (US)

(73) Assignee: Ventana Medical Systems, Inc., Tucson, AZ (US)

( * ) Notice: Subject to any disclaimer, the term of this patent is extended or adjusted under 35 U.S.C. 154(b) by 113 days.

(21) Appl. No.: 16/010,375

(22) Filed: Jun. 15, 2018

(65) Prior Publication Data

US 2018/0292638 A1  Oct. 11, 2018

Related U.S. Application Data

(63) Continuation of application No. PCT/EP2016/080970, filed on Dec. 14, 2016.
(Continued)

(51) Int. Cl.
*G02B 21/00* (2006.01)
*H04N 1/38* (2006.01)
(Continued)

(52) U.S. Cl.
CPC ......... *G02B 21/367* (2013.01); *G02B 21/006* (2013.01); *H04N 1/3876* (2013.01); *H04N 5/23212* (2013.01)

(58) Field of Classification Search
CPC ... G02B 21/367; G02B 21/006; H04N 1/3876
(Continued)

(56) References Cited

U.S. PATENT DOCUMENTS

2002/0090127 A1* 7/2002 Wetzel ............... G01B 7/003
382/133
2007/0069106 A1* 3/2007 Krief ............... G02B 21/244
250/201.3
(Continued)

FOREIGN PATENT DOCUMENTS

DE 102005040827 A1 6/2007
WO 2015007697 A1 1/2015

OTHER PUBLICATIONS

Bradley et al, A One-pass Extended Depth of Field Algorithm Based on the Over-complete Discrete Wavelet Transform, CSSIP.
(Continued)

*Primary Examiner* — Jeffery A Williams
(74) *Attorney, Agent, or Firm* — Kilpatrick Townsend & Stockton LLP

(57) ABSTRACT

A method and associated method and computer program product for acquiring focused images of a specimen on a slide, by determining optimal scanning trajectories. The method includes capturing a relatively low magnification image of the slide to locate the specimen, forming a grid that includes an arrangement of grid points, overlaying at least part of the grid over a field of view that covers at least part of the specimen, capturing a relatively high magnification Z-stack of images of the specimen within the field of view, determining a best focus for each grid point within said at least part of the grid to form a resulting grid of three dimensional points, and based on the resulting grid, determining one or more three dimensional scanning trajectories.

20 Claims, 17 Drawing Sheets

Related U.S. Application Data

(60) Provisional application No. 62/268,168, filed on Dec. 16, 2015.

(51) Int. Cl.
    *G02B 21/36*     (2006.01)
    *H04N 1/387*     (2006.01)
    *H04N 5/232*     (2006.01)

(58) Field of Classification Search
    USPC .......................................................... 348/79
    See application file for complete search history.

(56) References Cited

U.S. PATENT DOCUMENTS

| | | | |
|---|---|---|---|
| 2011/0025880 A1* | 2/2011 | Nandy | G01N 21/6458 |
| | | | 348/226.1 |
| 2013/0271594 A1* | 10/2013 | Olson | G02B 21/002 |
| | | | 348/79 |
| 2016/0370565 A1* | 12/2016 | Bredno | G02B 21/367 |

OTHER PUBLICATIONS

International Search Report and Written Opinion dated Apr. 5, 2017 in corresponding PCT/EP2016/080970 filed Dec. 14, 2016, pp. 1-15.

* cited by examiner

AUTO-FOCUS METHODS AND SYSTEMS FOR DIGITAL IMAGING USING MULTI-SPECTRAL TRAJECTORIES

RELATED APPLICATIONS

This patent application is a continuation of International Patent Application No. PCT/EP2016/080970, filed Dec. 14, 2016, which claims priority to and the benefit of U.S. Provisional Application No. 62/268,165, filed Dec. 16, 2015. Each of the above patent applications is incorporated herein by reference as if set forth in its entirety.

RELATED APPLICATIONS

The present disclosure generally relates to computer-based auto-focus systems and associated methods for imaging microscope slides. More particularly, the present disclosure relates to the use of multi-spectral trajectories for automated slide scanning to achieve high-quality image data with a high slide digitization rate.

BACKGROUND

Digital pathology equipment is often used to produce digital images of microscope slides. Pathologists and histo-technologists often visually examine the digital images to obtain information about tissue samples and to identify the most appropriate treatment to improve a clinical outcome. To produce color images, automated slide scanners often acquire images in each of red, green, and blue color channels and combine the images to produce an RGB image.

Scanners can further acquire a plurality of image channels with different spectral characteristics, like fluorescence or brightfield imagers with a bench of multiple or tunable filters to acquire image data. In order to achieve suitable image data, automated slide scanning often includes automatically scanning a tissue sample at a large number of different Z-planes. Many captured images provide little or no value because the image data is often out of focus in most of the Z-planes. This problem affects fluorescence and brightfield imaging using a filter bench, and RGB sensor, or any other method to acquire spectral characteristics.

For RGB-imaging, the Z-plane for the best focus in the blue or green color channel may not be the Z-plane for the best focus in the red color channel, especially if the features being imaged are small (for example, less than the wavelength of light). For multispectral imaging, the Z-plane for the best focus might be different for each individual channel. Image blur in one color channel can impair the overall color image quality leading to serious problems with interpretation, diagnosis, and/or automated image analysis.

To reduce blur, color slide scanners can acquire a complete Z-stack of images (e.g., a set of Z-stack of images for each color channel) and use complex auto-focus algorithms to create a single image from the Z-stacks. However, this requires significant acquisition time, memory to store a large amount of Z-stack data, and significant processing time to analyze the Z-stack data and to generate the color image.

More specifically, the Z-stack is composed of several (typically 3 to 15) images (or layers) for each color channel represented in the tissue being scanned. Acquiring a Z-stack is very time-consuming in that, as an example, the imaging of 7 layers takes nearly 7 times as long as an ordinary scan.

The problem is that the high magnification lenses needed for digitization of pathology slides exhibit an extremely narrow depth of field and therefore their imaging ability is limited by chromatic aberration. This means that if the lens focus is set so as to ensure that the elements of the specimen on the slide that are near to one color are best focused, the objects that are very different from that color will be somewhat blurred. In other terms, for different colors of interest, such as green and red, the z layer for the best focus may be so different that if the focusing algorithm is optimized for green objects, then red objects may be frequently out of focus.

Instead of, or in addition to, blurring from this effect, if an object is surrounded by material of a very different color, the object color may be mixed with that of the surrounding material because of optical diffraction effects. So, as used herein, the "best focus" does not necessarily mean the "sharpest focus", but instead it may mean the focus at which each object is best distinguished from its surroundings or from other objects from which it is desirable to distinguish it, whether or not they are nearby.

Alternatively, conventional color slide scanners can select a focus (or focal) plane for one channel and then scan other channels at the selected focus plane. For example, a focus plane can be selected for the green channel. The slide scanner acquires images in the red and blue channels at that focus plane to produce a color or multi-spectral image. However, the common focus plane used for acquiring images of all of the channels may not be the best focus plane for each channel, resulting in unwanted image blur in the composite image for features that are dominated by colors other than the one that dominated the focusing procedure.

The following conventional focusing methods have been proposed. One such method is the "best autofocus trajectory from a gray-scale image" method that is implemented in Ventana Medical Systems, Inc. scanners. While this method provides a high scan speed, there remains a continuous need for improvement, particularly with respect to the scanning focus for the color channels that are relatively different in spectrum from the color that dominates the gray-scale image.

According to another exemplary conventional focusing method, the scanner system acquires and stores a Z-stack of images in such a way that the specimen is fully imaged at each value of z. The range of z is chosen so that all of the present chromatic aberration is covered; that is, every color in the tissue will be in good focus in at least one of the layers in the Z-stack. This results in an image of the specimen at high magnification for each layer of the Z-stack for each color channel. Then, an image synthesis algorithm capable of creating a single image from such a Z-stack of images is employed to get a composite image showing all of the color channels in good focus. This approach provides high image quality, while resulting in prohibitive scan times and data file sizes.

Yet another scanning method includes the step of pre-digitization calibration with a calibration sample, in order to establish the value of z for the best focus for each of the various colors of interest in a field of view. The output of this step is often a lookup table or calibration curve that guides the subsequent digitization of slides.

There is therefore a need for new computer-based auto-focus systems, computer program products, and associated methods for digitally imaging microscope slides at a high speed, while avoiding the acquisition and storage of a complete Z-stack of images for each color channel.

SUMMARY

The present disclosure satisfies this need, and presents computer-based auto-focus systems, computer program products, and associated methods for imaging microscope slides by determining optimal multi-spectral trajectories for the slides being scanned, to achieve automated slide scanning that creates high-quality image data with a high slide digitization rate.

It is one objective of the present disclosure to automatically select and adjust the focus of a digital optical system, such as a microscope, while acquiring a digital image of the whole specimen.

It is another objective of the present disclosure to obtain an optimal tradeoff between the sharp focusing of objects of different stains in the scanned image, and the scanning speed. More specifically, the present image processing and scanning methods yield greatly reduced scan time and data file sizes, while providing a satisfactory focus for every color of interest represented in the tissue.

A further goal of the present disclosure is to avoid the use of a calibration slide and to provide a method that automatically and individually adjusts each slide to a "best focus". The determination of best focus is made with a combination of image processing and data analysis techniques that maximize a mathematical function of the acquired image values. As one example, focus can be determined with the mathematical function of the image gradients.

To this end, and in order to achieve high-quality image data with a high slide digitization rate, the digital imaging system (also referred to as digital imaging processor, digital imager, or optical processor) of the present disclosure may use the scanners developed by Ventana Medical Systems, Inc. to implement the digital imaging scanning according to the following steps:

The digital imaging system uses a relatively low magnification (e.g., 25 microns per pixel), to capture an image of the entire slide, and to process the captured image in order to locate the specimen. The captured image is also referred to as the Area of Interest ("AOI") thumbnail image. This step is generally referred to as: capture thumbnail image of entire specimen (or slide).

The digital imaging system then forms an arrangement of grid points within the specimen. This arrangement may include, for example, a grid formed of grid points that are separated by one or a few millimeters in the plane of the slide (i.e., in the "x" and "y" plane), such that the specimen is fully covered by the grid. This step is generally referred to as: overlay a grid over the entire specimen.

The digital imaging system then uses a relatively high magnification (e.g., 0.5 micron per pixel), to capture a "Z-stack" of camera images, at each grid point. The digital imaging system then determines a focus metric for each z value and the best focus (i.e., the best z value) for each grid point based on the image analysis of the Z-stack. The digital imaging system then discards the Z-stack of images. This step is generally referred to as: capture Z-stack images, determine best focus for each grid point, then discard Z-stack images.

The digital imaging system inputs the resulting grid of xyz points into an algorithm that computes the xyz trajectories for scanning of the slide. This step is generally referred to as: compute the xyz trajectories for the scanner.

More specifically, the present disclosure proposes to add, during the scanning operation, one or more complete images of the specimen at additional scan trajectories parallel to, but offset in the z direction from a gray-scale trajectory ("best autofocus trajectory from a gray-scale image"). As part of the analysis of the Z-stack images to determine the best focus for the gray scale image at each of the grid points, a digital imaging system additionally assesses the Z-stack at each grid point, to determine where in the z direction, one (or more) other color channels present in the image, appear to have a best focus z-value that is significantly different from the best focus for the gray scale image.

Whether a color channel has a significantly different best focus z-value is determined from either an "a priori" rule or table, or by image analysis that takes into account one or more of a selection of gradient filtered images.

Such color channels could be the red and/or the blue channel of an RGB camera, assuming that the gray scale autofocus is dominated by the green channel. In an alternative embodiment, the one or more color channels could be a combination of the RGB channels designed to emphasize one or more biomarkers. In another alternative embodiment, the one or more color channels could correspond to one or more of the color filters or colored light sources that are used in imaging the slide, or to one or more of the colors extant in a fluorescent image.

The offset distance of the additional trajectories is mostly determined by a best focus type of computation, similar to that used for the gray scale image, for the one or more colors or biomarkers of interest for the Z-stack at each grid point.

BRIEF DESCRIPTION OF THE DRAWINGS

The various features of the present disclosure and the manner of attaining them will be described in greater detail with reference to the following description, claims, and drawings wherein:

FIGS. 17A and 17B illustrate an example of a breast cell nucleus that has been stained to reveal the degree of expression of the HER2 gene, with the three colors of interest being: blue, red and black, wherein FIG. 17A illustrates the best focus for the red dot, and FIG. 17B illustrates the best focus for the black dot.

It will be appreciated that for simplicity and clarity of illustration, the elements shown in the figures have not necessarily been drawn to scale. For example, the dimensions of some of the elements may be exaggerated relative to other elements for clarity. Further, where considered appropriate, reference numbers may be reused among the figures to indicate corresponding or analogous features.

DETAILED DESCRIPTION

Figure 1:
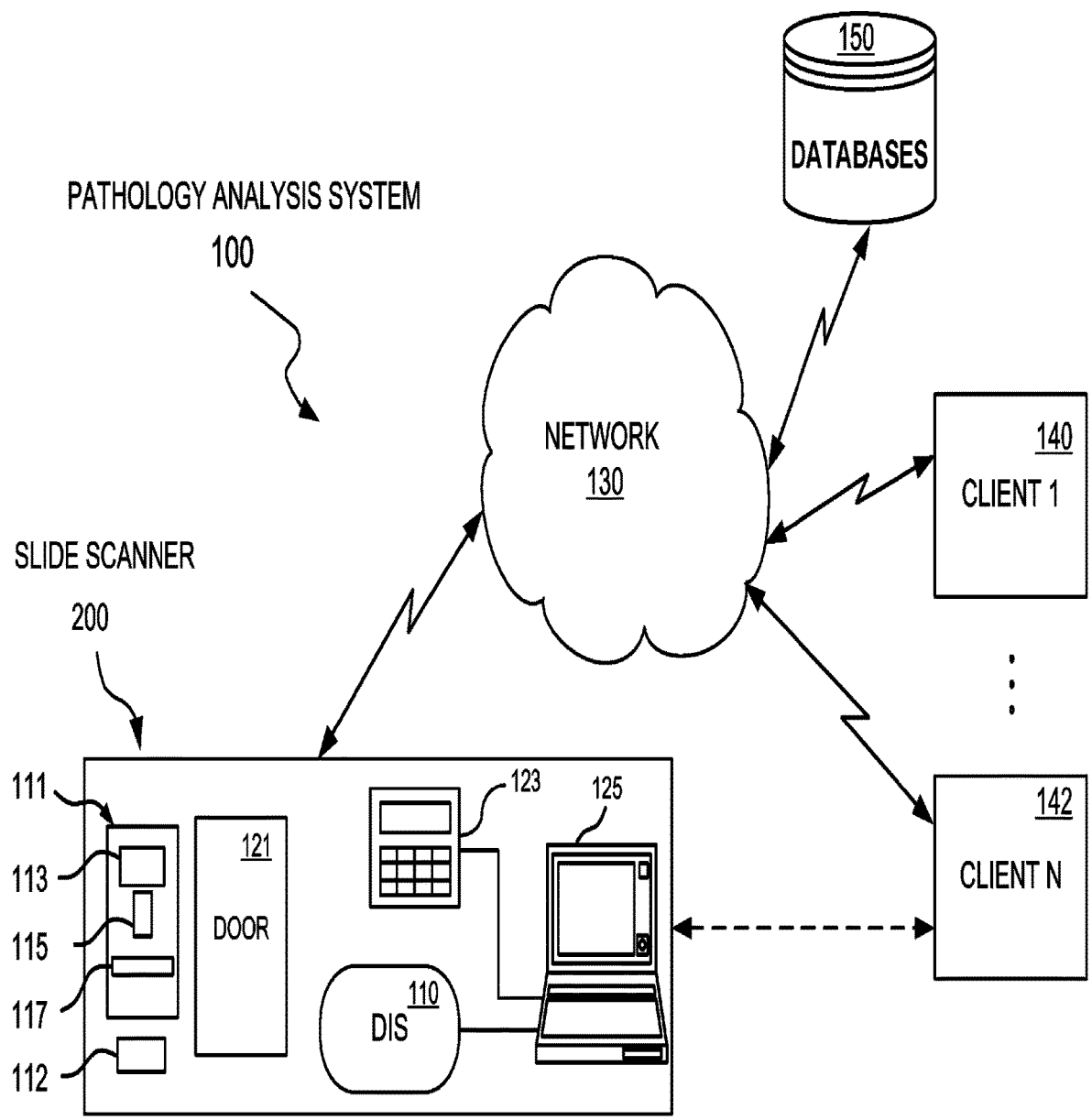
FIG. 1 illustrates a computer-based digital imaging system that forms part of a slide scanner, operating in a network environment for performing auto-focus techniques in accordance with the present disclosure.

FIG. 1 illustrates a pathology analysis system 100 operating in a network environment for performing auto-focus techniques (also referred to herein as "automated slide scanning" or "scanning") for digital imaging using multispectral trajectories, in accordance with one embodiment of the present disclosure. As used herein, "auto-focus" refers to the automated digitization of microscope slides so that the resulting images are useful to pathologists for diagnosis.

The microscope slides are also referred to herein as "specimen slides" or "slides". The microscopes slides of interest to the present disclosure are intended to hold very thin layers of biological specimens (e.g., cells or tissues). The specimens are typically stained or otherwise marked to perform any one of more of the following functions:

(i) absorb light that is being transmitted through the slide ("brightfield imaging"),
(ii) scatter light emanating from an external light source, or
(iii) emit light that is stimulated by the external light source ("fluorescent imaging").

The latter two functions are often referred to as "darkfield imaging".

In order to achieve high-quality image data with a high slide digitization rate, automated slide scanning requires an autofocus method because the thickness of the slide, the positioning of the slide along the optical axis, and the thickness of the specimen are variable.

Referring to FIG. 1, the pathology analysis system 100 generally includes a slide scanner 200 and a plurality of client computer systems (or user stations) 140, 142 that communicate over a network 130. A specimen-bearing microscope slide 117 is loaded into the slide scanner 200. The scanner 200 performs auto-focus techniques and produces images of the specimen in multiple color channels.

As used herein, full color (or multi-spectral) may mean, for example, the three channels of red, green, and blue colors for an RGB camera; all the different color channels for a fluorescent image; or an image made with colored filters or colored light sources. Typically, Z-stack images are collected at each of several (typically 7 to 15) values of z. "Z-stack" means that at each grid point of a grid that overlays the specimen, the slide position along the optical axis ("z axis") is varied in small steps, such as 0.5 microns, and a full color image or single channel image is captured by the camera at each value of z.

In some embodiments, the scanner 200 includes a microscope 115 (also referred to as lens or lenses) for brightfield and/or fluorescent imaging of the specimen-bearing microscope slides 117. The scanner 200 may further be a whole-slide scanner, one example being the VENTANA iScan HT product of Ventana Medical Systems, Inc.

The users of the client computer systems 140, 142, such as pathologists, histotechnologists, or like professionals, are able to access and view the scanning output (e.g., enhanced images of the slides 117) on a real time basis, either remotely or locally. The client computer systems 140, 142 further enable the users to access scanning data that are stored on networked databases 150.

In one embodiment, the scanner 200 further includes a computer-based digital imaging system 110 that is configured to improve the "sharpness" of the captured images by capturing images at different Z-slices (e.g., Z-planes generated by Z-stacking) and by automatically and individually adjusting each slide to best focus z values (also referred to as best focus points or best focus settings) for selected color channels or filter bands.

As it will explained later in more detail, the digital imaging system 110 determines the best focus z values with a combination of image processing and data analysis techniques that maximize the mathematical function of the image gradients. For each gray-scale and selected color channel or filter band of interest, the digital imaging system 110 identifies the focal points on the Z-slices, e.g., as having the least amount of blur or showing objects in this color with the best distinction from background or surrounding objects. This is referred to as the best focus point in each Z-slice that is "in focus" or the sharpest. Digital imaging system 110 uses the identified "best focus points" to determine the scanning trajectory (or trajectories) of the scanner 200, and to capture focused images. The focused images are combined (or stitched) to produce a focused composite image. Because the digital imaging system 110 uses the best focus points for the selected color channels, the amount of chromatic aberration observed in the final composite image is significantly reduced, and the scanning speed optimally improved.

The techniques described herein can be used to enhance known or available auto-focus and Z-slicing techniques, such as passive or active auto-focus techniques including, but not limited to, phase detection auto-focus techniques, contrast detection auto-focus techniques, etc.

In the particular exemplary embodiment of FIG. 1, the scanner 200 generally includes one or more image capture devices 111, digital imaging systems 110, and processors 125 (i.e., computers or terminals). More specifically, an image capture device 111 generally includes a digital imager 113 (e.g., a digital camera) with an optical system (e.g., one or more lenses 115, sensor focus lens groups, microscope objectives, etc.), an imaging sensor (e.g., a charge-coupled device (CCD), a complimentary metal-oxide semiconductor (CMOS) image sensor, or the like), or the like.

In digital embodiments, the digital imager 111 can include a plurality of lenses 115 that cooperate to provide focusing (e.g., autofocusing). A CCD sensor can capture a digital image of the specimen slide 117. In certain embodiments, the digital imager 111 has red, green and blue color channels for producing color images and is operable to capture images at different vertical planes or Z-slices. In other embodiments, the digital imager 111 is a monochromatic or color sensor, the optical system includes multiple and/or tunable filters, and multispectral or color image channels are created by acquiring multiple images from the imager 111 with different filters or filter settings. One method of producing a color image includes determining one or more scan areas comprising a region or slide position of the microscope slide that includes at least a portion of the specimen. The scan area may be divided into a plurality of snapshots. An image can be produced by combining (or stitching) the snapshots. The combined image of the whole specimen or slide 117 can have snapshots with images in the RGB channels or multispectral color image channels at the same or different focal planes.

The scanner 200 can also include an access door 121, a memory 112, and a separate controller 123. The slides 117 are loaded into the scanner 200 via the access door 121. The xyz coordinates of the best focus points can be stored in memory 112. The controller 123 can be used, in conjunction with, or independently from the processor 125, to control the operation of the scanner 200, by processing the operation of the digital imaging system 110. To this end, the digital imaging system 110 can be (or can include), at least in part, a software application, algorithm, computer program product, or the like, that are collectively referred to herein as computer program product. The computer program product is comprised of a plurality of executable instruction codes, and that is embedded or stored on a computer storage medium. The processor 125 (and/or the controller 123) executes the instruction codes of the digital imaging system 110 as it will be explained later in more detail.

The processor 125 can include a desktop computer, a laptop computer, a tablet, or the like and can further include digital electronic circuitry, firmware, hardware, memory, a computer program, a processor (including a programmed processor), and a storage medium for storing digital images in binary form. The images are divided into a matrix of pixels, such that the pixels include of a digital value of one or more bits, defined by the bit depth. The digital value may represent, for example, energy, brightness, color, intensity, density, elevation, or a classified value derived through image processing. Non-limiting exemplary digital image formats include, but are not limited to, bit-mapped, joint pictures expert group (JPEG), tagged image file format (TIFF), and graphics interchange format (GIF), as well as other digital data formats.

The network 130 (or a direct connection) interconnects the scanner 200 to the client computers 140, 142. The network 130 generally includes one or more gateways, routers, bridges, combinations thereof, one or more servers, and one or more websites that are accessible to the client computers 140, 142 and that can send and receive information for use thereby. A server may include one or more associated databases for storing information (e.g., digital images, algorithms, staining protocols, or the like). The network 130 can include, but is not limited to, data networks using the Transmission Control Protocol (TCP), User Datagram Protocol (UDP), Internet Protocol (IP) and other data protocols. The client computer systems 120 can perform the methods and techniques discussed herein. Components and features of the client computer system 120 can be mixed and matched with other components and features of the disclosed technology.

Figure 2:
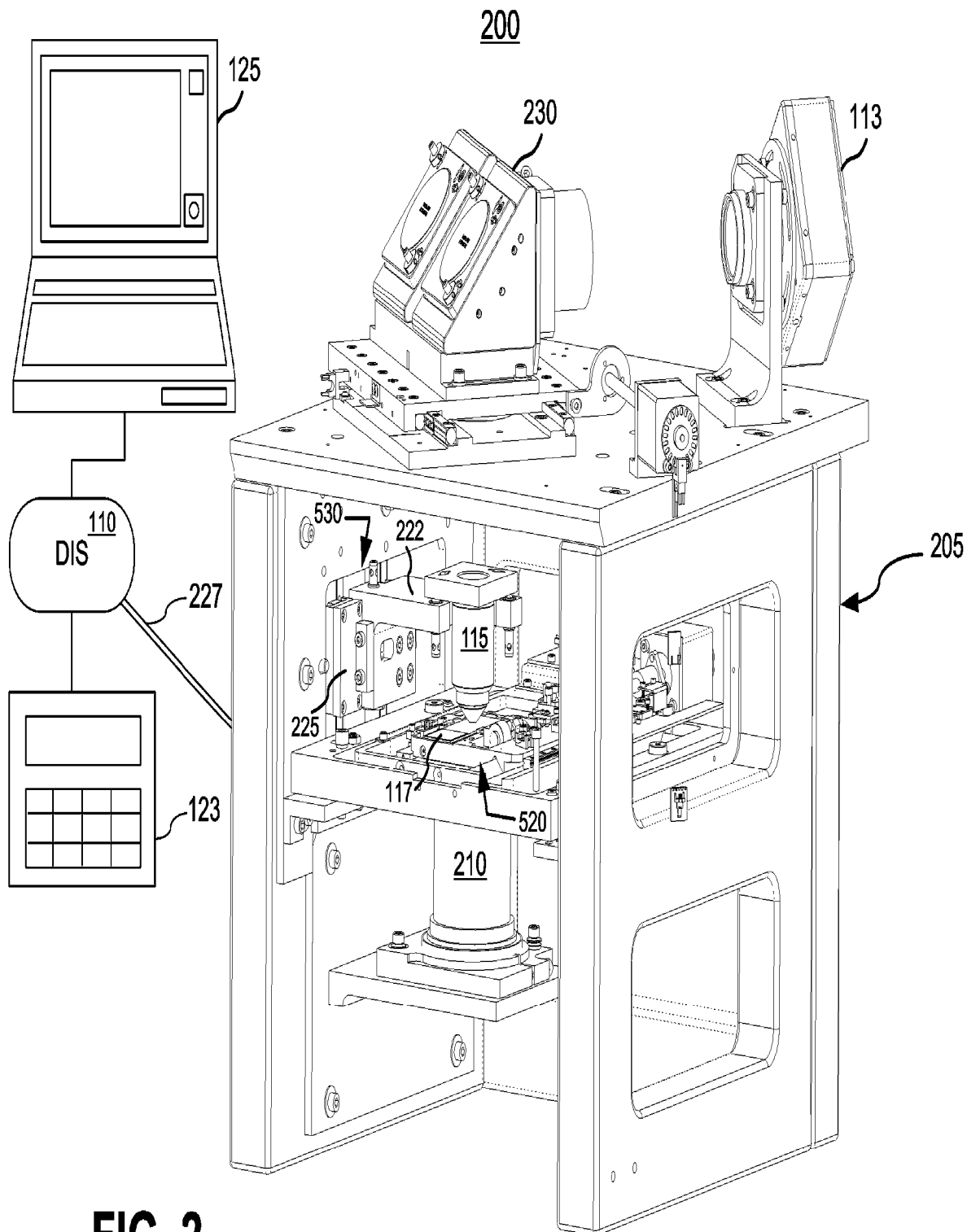
FIGS. 2, 3, and 4 illustrate various general views of the slide scanner of FIG. 1, further showing the general mechanical, optical, and processing components of the slide scanner.
Figure 3:
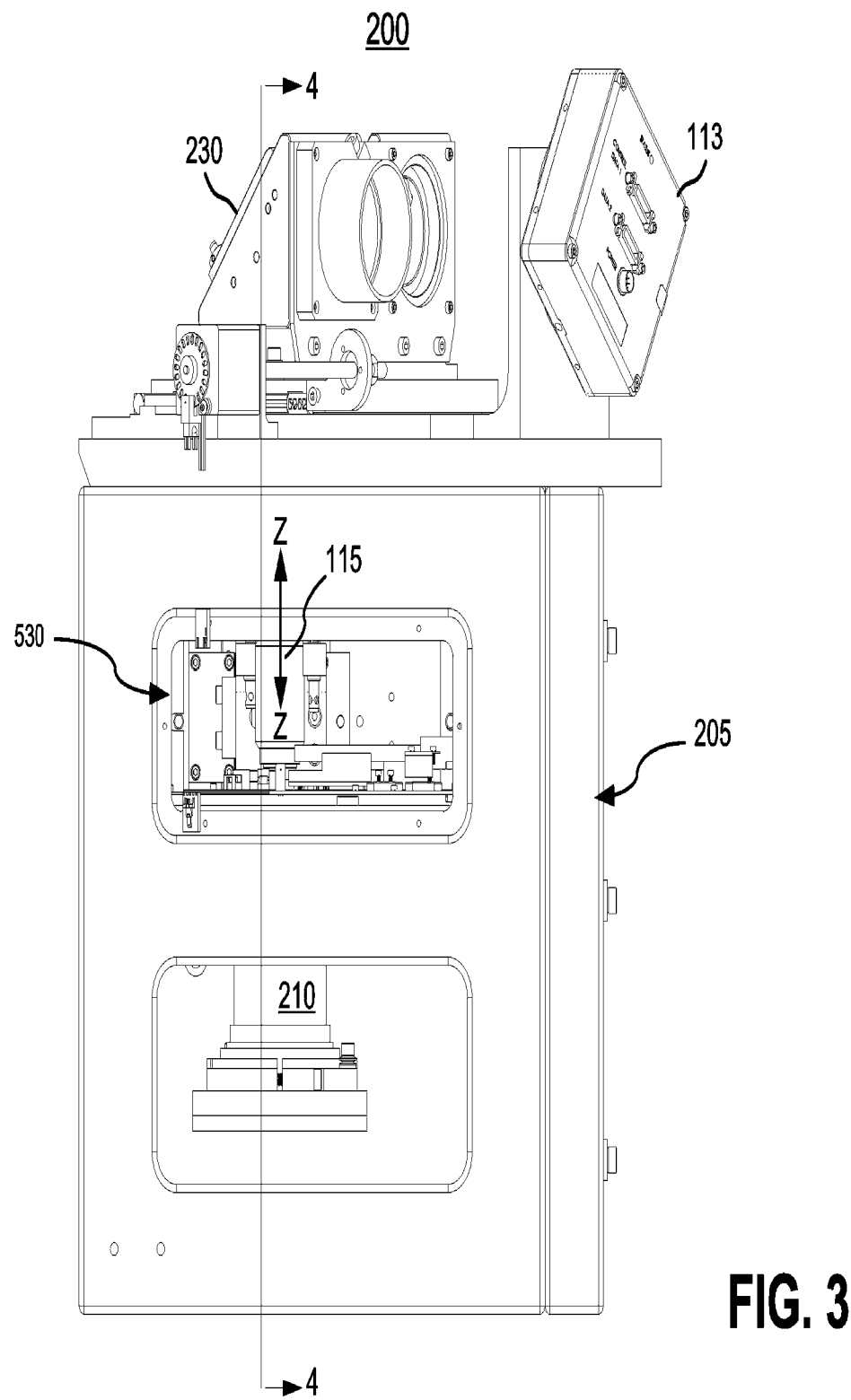
Figure 4:
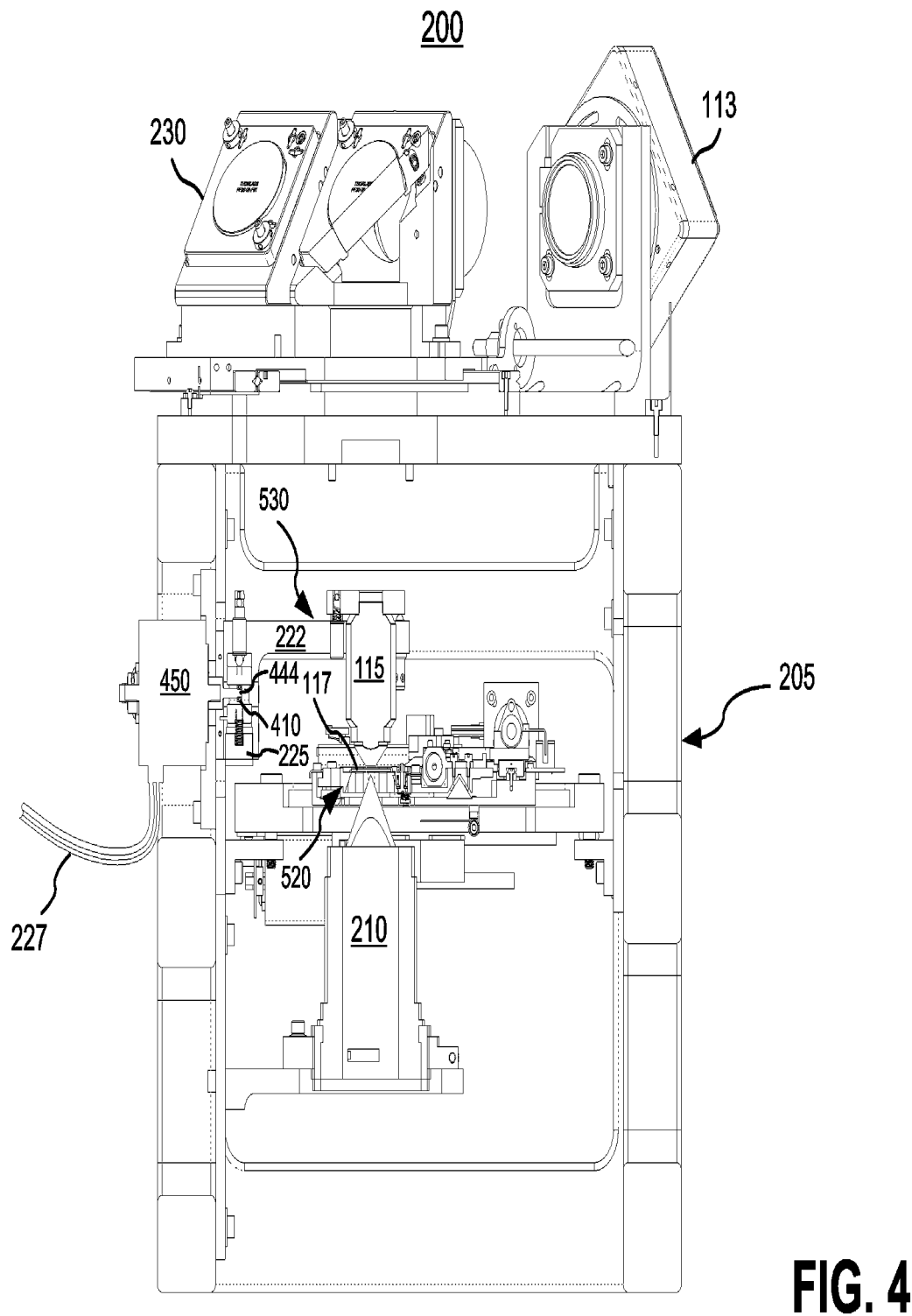

FIGS. 2, 3, and 4 illustrate the mechanical, optical, and processing components of the scanner 200. The scanner 200 includes a platform 205 that supports the various components of the scanner 200. More specifically, the platform 205 provides support for a light source 210, the digital imager 113, an optical splitter 230, a slide stage assembly 520, and a lens assembly 530.

The slide stage assembly 520 generally comprises a slide holder that supports the specimen slide 117, and a drive for setting the x-y position of the slide 117. The lens assembly 530 generally comprises the lenses 115, a lens platform 222 that supports the lenses 115, a lens bearing assembly 225, and a drive for setting the vertical position of the lenses 115 along the arrow Z-Z (z-axis) of FIG. 3. As illustrated in FIG. 4, the lens bearing assembly 225 includes bearings 410 and an off-center post 444 that rotates and this is connected to an external motor 450.

As further illustrated in FIG. 2, a cable 227 interconnects the processor 125 and the controller 123, and transmits instructions and data provided by the digital imaging system 110 to the various components of the scanner 200. It should be understood that while the interconnection is described herein as a cable 227, other communications means are possible, including but not limited to wireless and network communications. In addition, the cable 227 transmits power to the various electrically operated components of the scanner 200.

Figure 5:
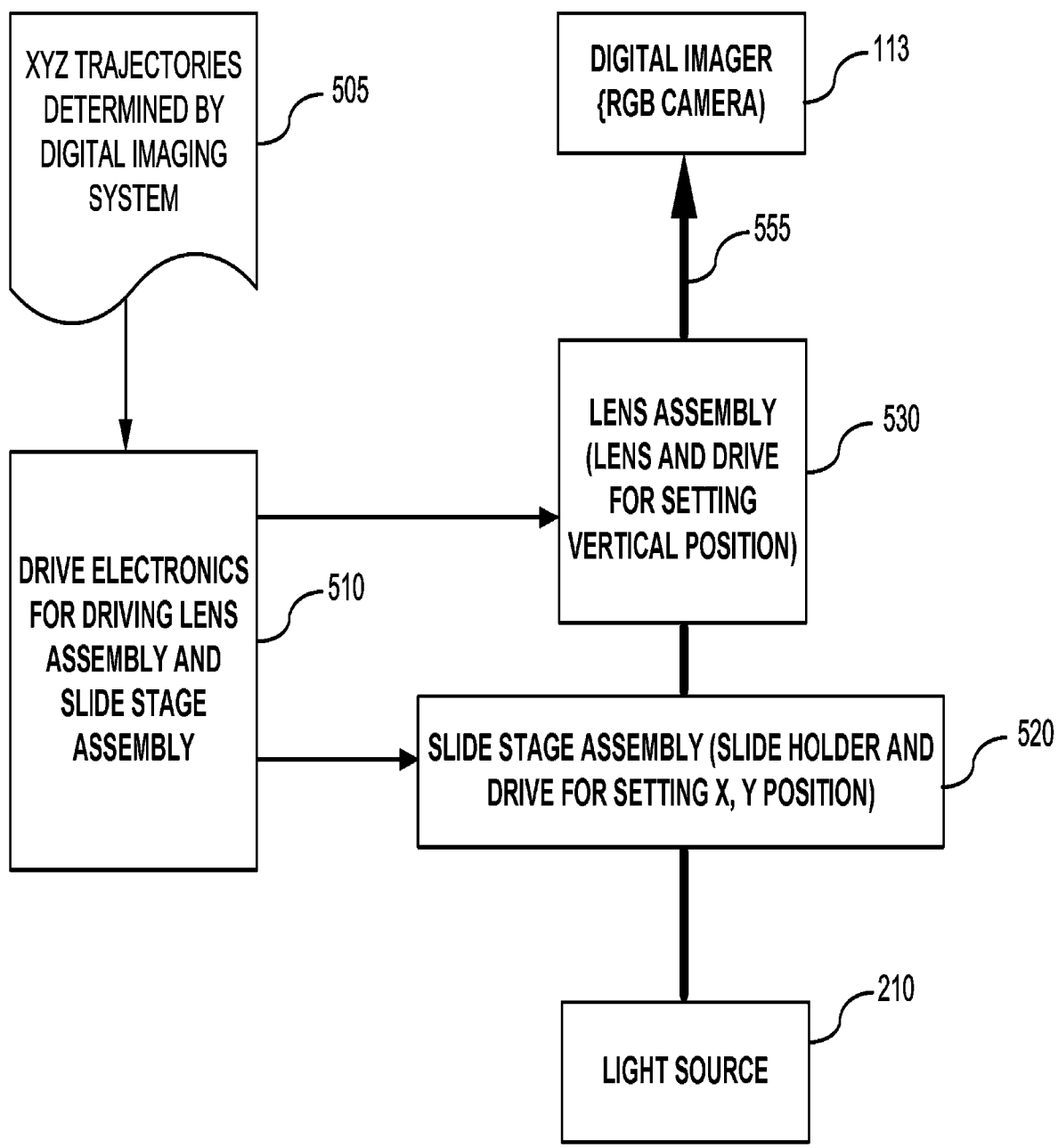
FIG. 5 is an overview block diagram of some of the mechanical and optical components of the slide scanner of FIG. 1, illustrating its overall operation in accordance with the present disclosure.

FIG. 5 is a flowchart 500 that illustrates the general operation of the scanner 200. As it will be explained later in greater detail, the digital imaging system 110 determines the xyz trajectories to be used by the scanner 200 to move the lens assembly 530 along the z direction (z axis), and to move the slide 117 in the x-y directions. To this end, the drive electronics 510 that could be integrated within either the controller 123 and/or the processor 125, receive the xyz trajectories data from the digital imaging system 110.

The drive electronics 510 derive the appropriate drive instructions from the xyz trajectories data, and transmit the corresponding drive instructions to the lens assembly 530 for setting the vertical position along the z direction, and to the slide stage assembly 520 for setting the x and y positions along the xy plane. The light beam (or optical beam), indicated by the arrow 555, emanates from the light source 210 and is directed toward the digital imager 113, via the optical splitter 230.

Figure 6:
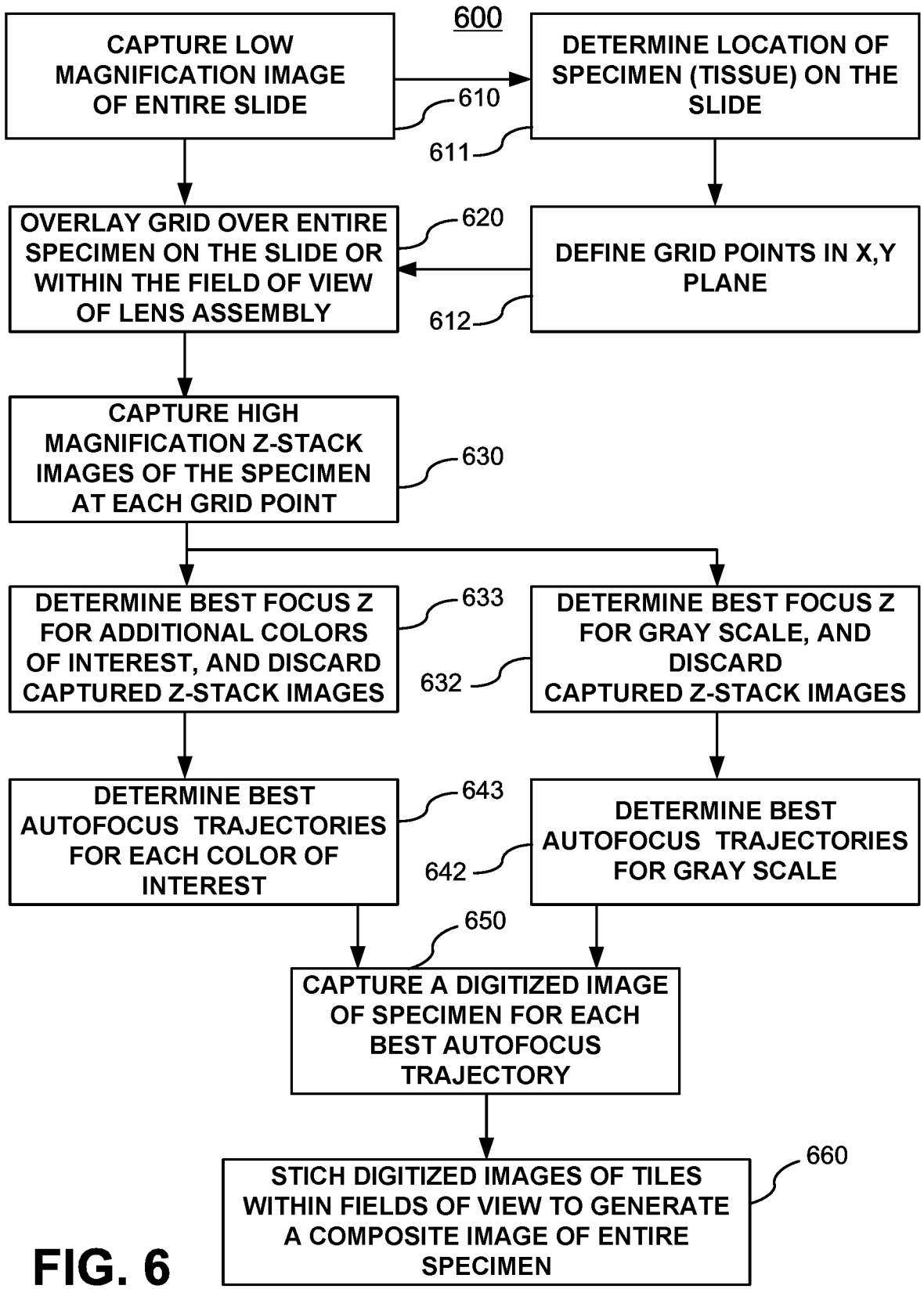
FIG. 6 is a flow diagram illustrating a scanning process that is implemented by the slide scanner of the previous figures, in accordance with the present disclosure.
Figure 7:
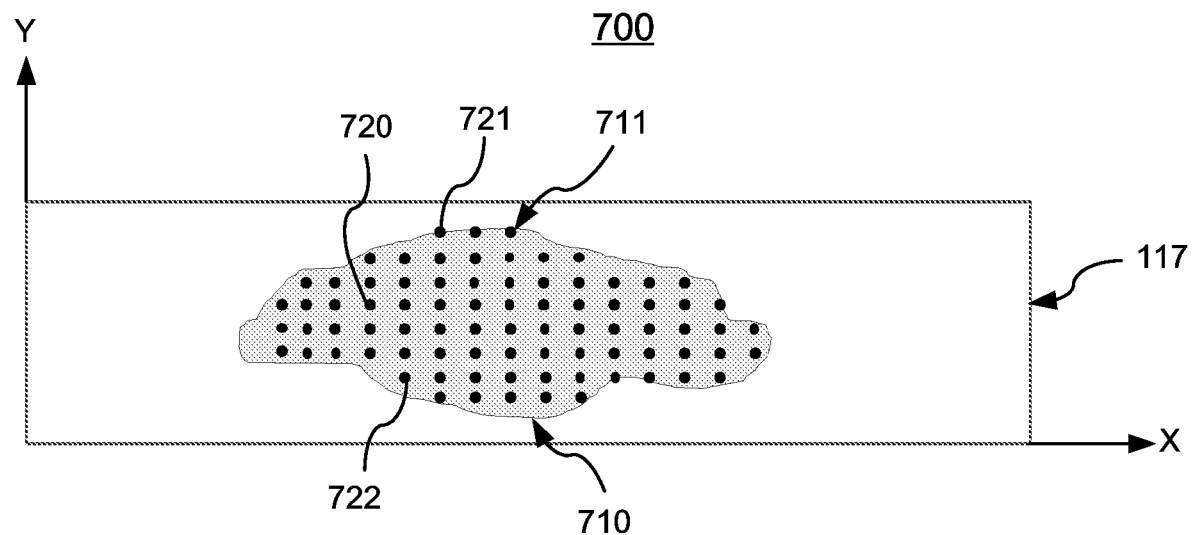
FIG. 7 is a relatively low magnification or thumbnail image of the entire specimen slide illustrating a grid that overlays the entire specimen to be scanned in accordance with the present disclosure.
Figure 8:
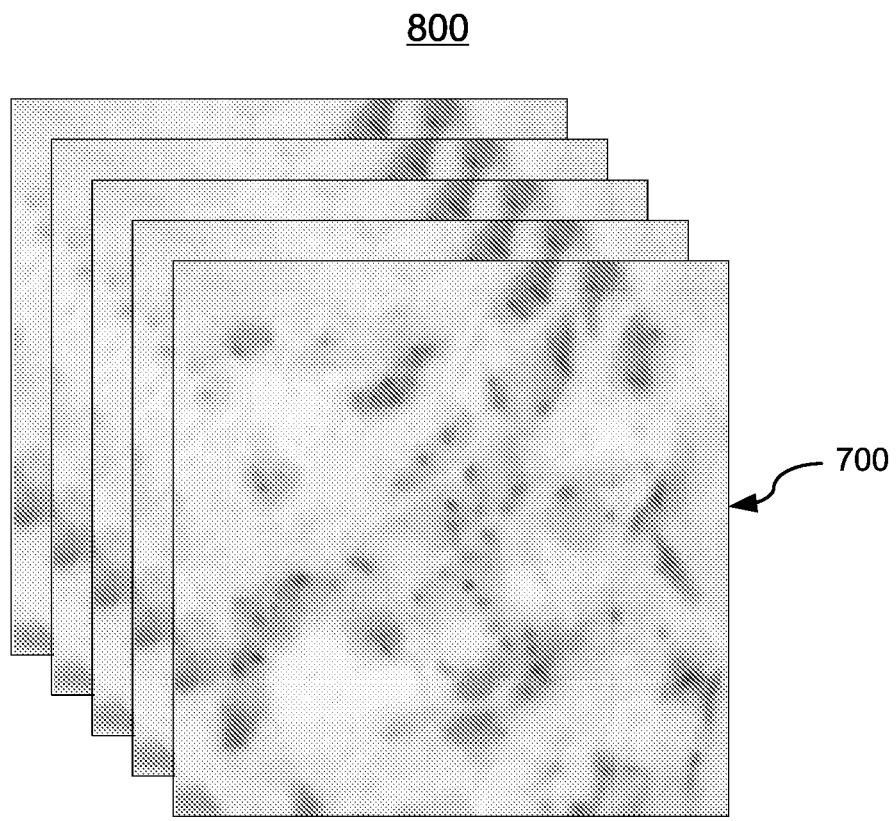
FIG. 8 is a relatively high magnification of a Z-stack of images that are captured by the slide scanner at each grid point of the grid of FIG. 7, in accordance with the present disclosure.

Referring now to FIGS. 6, 7, and 8, FIG. 6 illustrates an overall operation (or process) 600 of the digital imaging system 110. At step 610, the digital imaging system 110 causes the lens assembly 530 to use a relatively low magnification (e.g., 25 microns per pixel) to capture an image 700 (FIG. 7) of the entire specimen slide 117. The captured image 700 is also referred to as the AOI thumbnail image 700.

At step 611, the digital imaging system 110 processes the captured image 700 in order to locate a specimen 710 or a part thereof, on the slide 117.

At step 612 of process 600, the digital imaging system 110 defines a grid 711 (FIG. 7) that forms an arrangement of grid points (e.g., 720, 721, 722, etc.). The grid points (e.g., 720, 721, 722, etc.) are separated by for example a few millimeters or the fraction of a millimeter in the plane of the slide 117, that is in the "x" and "y" plane or xy plane. It should be understood that the grid 711 may have an even or irregular arrangement (or distribution) of grid points in the xy plane.

At step 620, the digital imaging system 110 overlays the grid 711 over the entire specimen 710.

At step 630, the digital imaging system 110 instructs the lens assembly 530 (FIG. 5) to use a relatively high magnification (e.g., 0.5 micron per pixel), in order to capture a "Z-stack" of images 800 (FIG. 8), at each grid point (e.g., 720, 721, 722, etc.).

Figure 11:
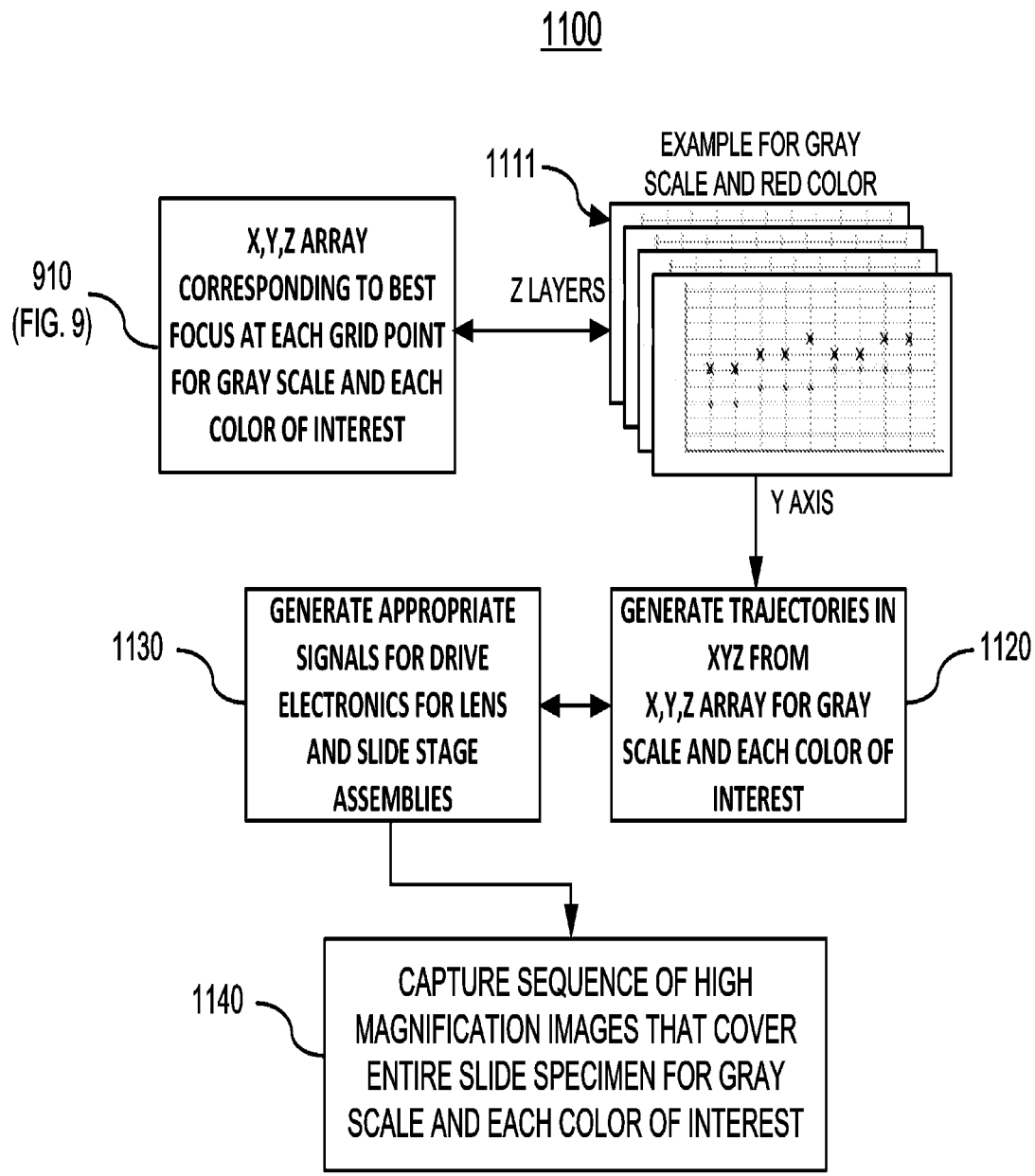
FIG. 11 illustrates a process that is mainly implemented by a digital imaging system of the slide scanner, to generate x,y,z arrays that correspond to the best focus at each grid point and each color of interest, to generate scanning trajectories in xyz based on the x,y,z arrays, and to generate signals for drive electronics that form part of the slide scanner, to selectively drive a slide stage assembly and a lens assembly for capturing a sequence of high magnification images that cover the entire specimen for gray scale and each of color interest.

At steps 632 and 633, the digital imaging system 110 uses the Z-stack images 800 for each grid point (e.g., 720, 721, 722, etc.) to determine the values of z that correspond to the best focus points for gray scale and for each color of interest, respectively. As it will be explained later in connection with FIG. 11, this determination of the best focus points results in one or more x,y,z arrays 1111: one for the gray scale and one for each color of interest. The digital imaging system 110 then discards the Z-stack images 800 but stores the best focus x and y values for each best focus z.

At steps 642 and 643, the digital imaging system 110 uses the resulting x,y,z arrays 1111 representative of the best focus points (or z values) to compute the best xyz scanning trajectories for gray scale and each color of interest. Exemplary autofocus (or scanning) trajectories 1300, 1400, 1500, 1600 will be described later in connection with FIGS. 13, 14, 15, 16, respectively.

At step 650, the digital imaging system 110 causes the lens assembly 530 to capture a digitized image 1810 (FIG. 18) of the specimen 710 for each of the autofocus trajectories 1300, 1400, 1500, 1600.

Figure 18:
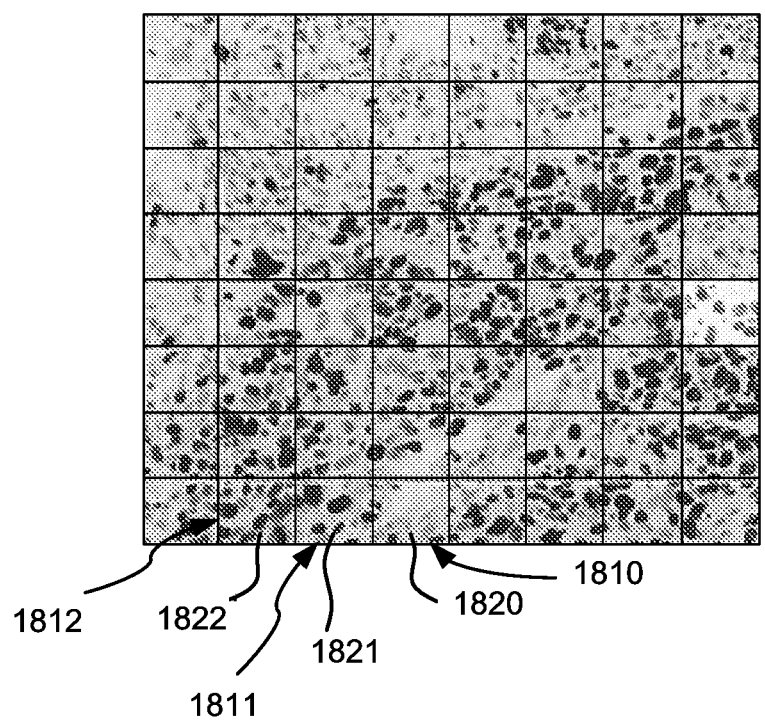
FIG. 18 illustrates the stitching operation of a plurality of tiles, which is executed by the digital imaging system to generate a final rendering of the entire specimen that has been scanned by the slide scanner according to the present disclosure.

As a complementary step 660, if at step 620 the grid 711 falls outside the field of view of the lens assembly 530, then the specimen 710 is divided into a matrix of smaller tiles (e.g., 1810, 1811, 1812, etc.) as illustrated in FIG. 18, and the grid 711 is overlaid over one of the tiles (e.g., 1810). The digital imaging system 110 repeats steps 620 through 650 for each of the other tiles (e.g., 1811, 1812, etc.). The resulting digitized images (e.g., 1820, 1821, 1822, etc.) are then stitched by the digital imaging system 110, to generate a composite image.

Figure 9:
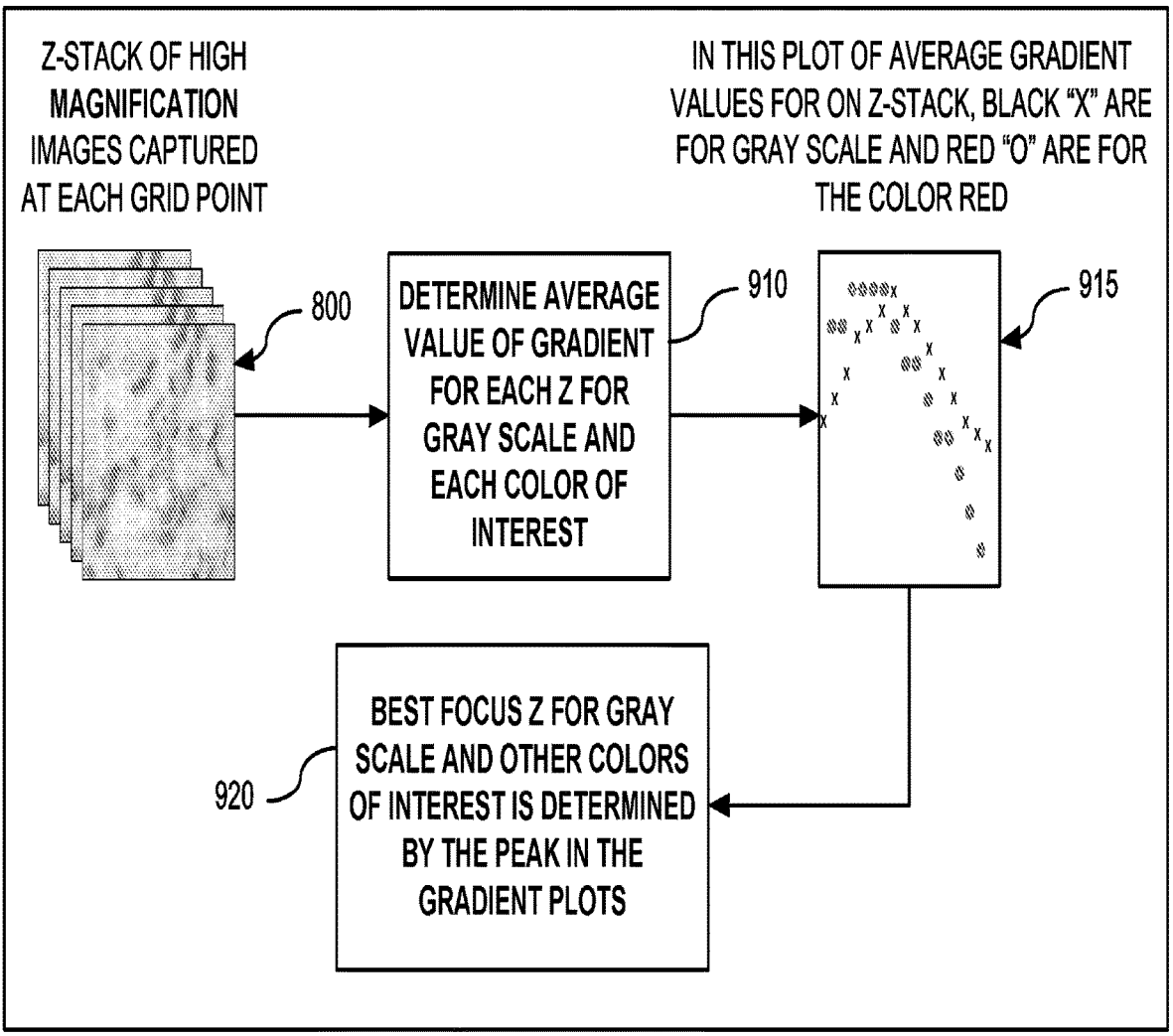
FIG. 9 illustrates a process for determining the best focus z values for gray scale and additional colors of interest, which process is repeated at each grid point of the grid of FIG. 7, in accordance with the present disclosure.
Figure 10:
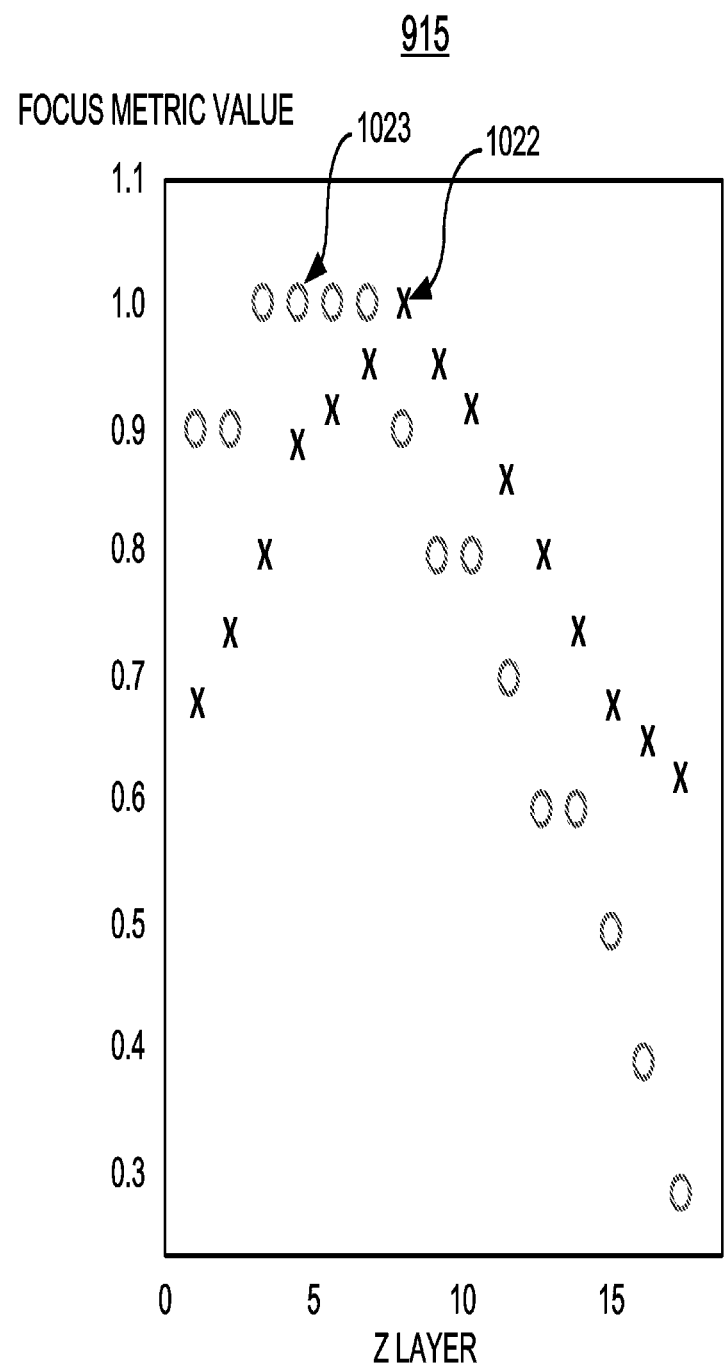
FIG. 10 is an enlarged view of a focus metric value plot that visually illustrates the average values of the gradient for each z value, and that is determined by the process of FIG. 9 in accordance with the present disclosure.

With reference to FIGS. 9 and 10, they provide a more detailed description of steps 632 and 633 of FIG. 6, supported by an exemplary illustration. FIG. 9 represents a process 900 that combines steps 632, 633 for determining the best focus z values for gray scale and additional colors of interest, respectively. Process 900 is repeated for each grid point (e.g., 720, 721, 722, etc.).

At step 910, the digital imaging system 110 uses the Z-stack of high magnification images 800 that are captured at each grid point (e.g., 720, 721, 722, etc.), to determine the average value of the gradient for each z value, for the gray scale and each color of interest. Within each Z-stack, the image 800 with the largest average gradient is defined as the "best focus", and the corresponding z is recorded as the best focus in z for that xyz point.

As used herein, "gray-scale image" means that the R, G, and B channels of the digital imager 113 are combined into a gray-scale image or that one color channel is selected to be the gray-scale image. The largest average gradient used here is an example of what is known as the "focus metric", namely a number that corresponds to the quality of focus. The scanning trajectory that is determined using the teaching of the present disclosure is referred to as the "best autofocus trajectory from a gray-scale image".

According to one embodiment of the present disclosure, the selection of the color channels to be used (or excluded) further improves the scanning speed without significantly affecting the focusing capability of the scanner 200. More specifically, the high magnification lenses 115 needed for the digitization of the pathology slides 117 result in an extremely narrow depth of field and therefore their imaging ability is limited by chromatic aberration. This means that if the z-values are determined so as to ensure that the elements of the specimen 710 that are near to green in color will be in sharp focus, which is typical of gray-scale imaging, the elements that are very reddish (for example) will be somewhat blurred. If the red features are rather small, this blurring can cause the resulting digital image of the slide to be compromised, from a diagnostic standpoint, or even completely useless. "Reddish" is just an example, and any object in the specimen 710 that is sufficiently different in color from the "best autofocus trajectory from a gray-scale image" to be blurred by chromatic aberration is of interest to the present disclosure. This problem is associated with the digitization of both brightfield and darkfield images.

Figure 17A:
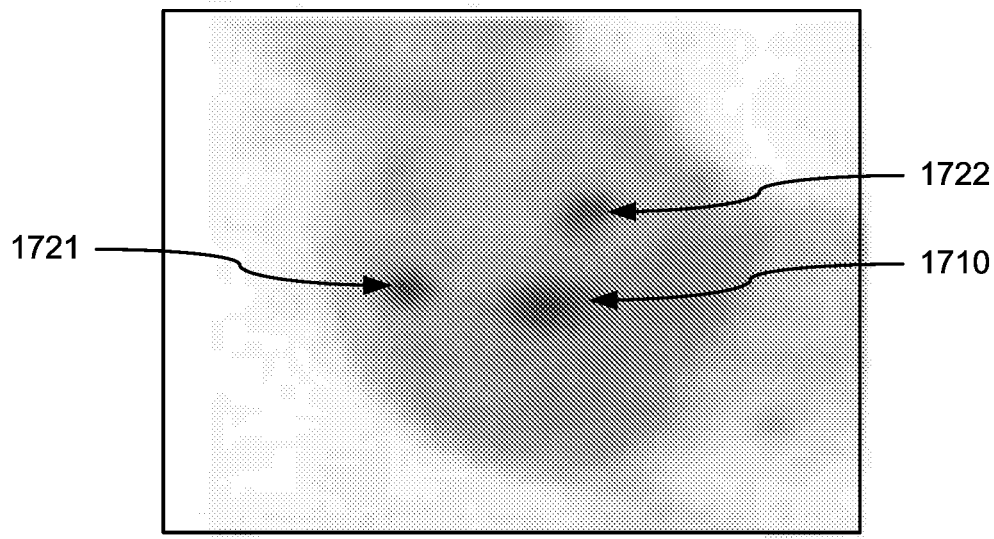
Figure 17B:
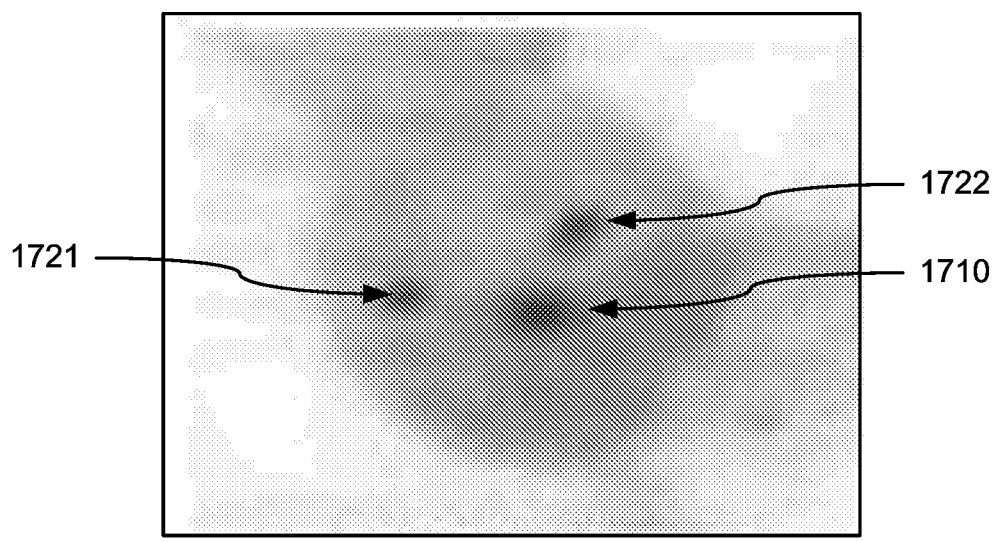

FIGS. 17A and 17B illustrate an example of a breast cell nucleus 1700 that has been stained to reveal the degree of expression of the HER2 gene, with the three colors of interest being: blue, red and black. FIG. 17A illustrates the best focus for the red dot 1710, and FIG. 17B illustrates the best focus for the black dots 1721, 1722.

In FIG. 17A, the blue color refers to the nucleus 1700, while the red color indicates the presence of Chromosome 17 and the black color indicates the expression of the HER2 gene. FIG. 17A shows the best focus for the red dot 1710, which is colorful and well formed. FIG. 17B shows the best focus for the black dots 1721, 1722. While the red dot 1710 in FIG. 17A is more clearly red than in FIG. 17B, the black dots 1722 are more distinct in FIG. 17B than in FIG. 17A. In this example, the specimen 710 was imaged with 15 different focus z-positions separated by 0.25 microns, at fixed xy coordinates.

Referring now to FIGS. 9 and 10, the plot 915 illustrates the average values of the gradient for each z value. Plot 915 shows an exemplary response of a suitable focus metric for red dots (represented by circles) versus a similar metric for black dots (represented by Xs). The vertical axis in plot 915 is the value of the metric, while the horizontal axis is the number of the Z layer. It should be noted that in this particular example, the "best focus" for red is at least two values of z to the left of that for black. Experimental data over this set indicate that the offset between the best focus for red and black vary, slide to slide, 2 to 6 Z layers, where each set of consecutive layers was separated by 0.25 microns.

At step 920, the digital imaging system 110 uses plot 915 to determine the best focus z for gray scale and other colors of interest, as the peaks 1022, 1023 (FIG. 10), respectively, in the color related gradient plots.

In general, the autofocus method 600 of the present disclosure determines a value z as focus setting with the highest focus metric at multiple positions (x,y) in the specimen 710. To elaborate, the (x,y) points determined by this autofocusing step can be separated by a few millimeters. Combining each position (x,y) with the position z of the best focus metric yields a point cloud (x,y,z) in 3D space. These points typically will not lie in a plane, because of the unevenness of the specimen 710. In order to drive the electronics 510 (FIG. 5) that control the xyz movement of the slide 117 and focus position as it is scanned, a continuous path or trajectory must be fit to the grid of xyz points (best focus points or best focus Z points). This continuous path will herein be referred to as the "scanning trajectory" (e.g., 1300, 1400, 1500, 1600).

With reference to FIGS. 11 through 16, they provide a more detailed description of steps 642, 643, and 650 of FIG. 6, supported by exemplary illustrations. Once process 900 is completed, as described earlier in connection with FIG. 9, for determining the best focus z valued for gray scale and additional colors of interest, process 1100 of FIG. 11 proceeds to step 1120 that combines steps 642, 643 of FIG. 6. At step 1120, the digital imaging system 110 generates the scanning trajectories in xyz from the x,y,z arrays 1111.

At step 1130, process 1100 generates the appropriate signals for the drive electronics 510 to selectively drive the slide stage assembly 520 along a plane that is perpendicular to the optical axis (e.g., xy plane), and for the lens assembly 530 to drive the lenses 115 along the optical axis (e.g., z axis), while images from the camera are collected, so that at step 650, the scanner 200 captures a sequence of high magnification images that cover the entire slide specimen 710 (or a tile within the field of view of the lenses 115), for gray scale and each of color interest.

Figure 12:
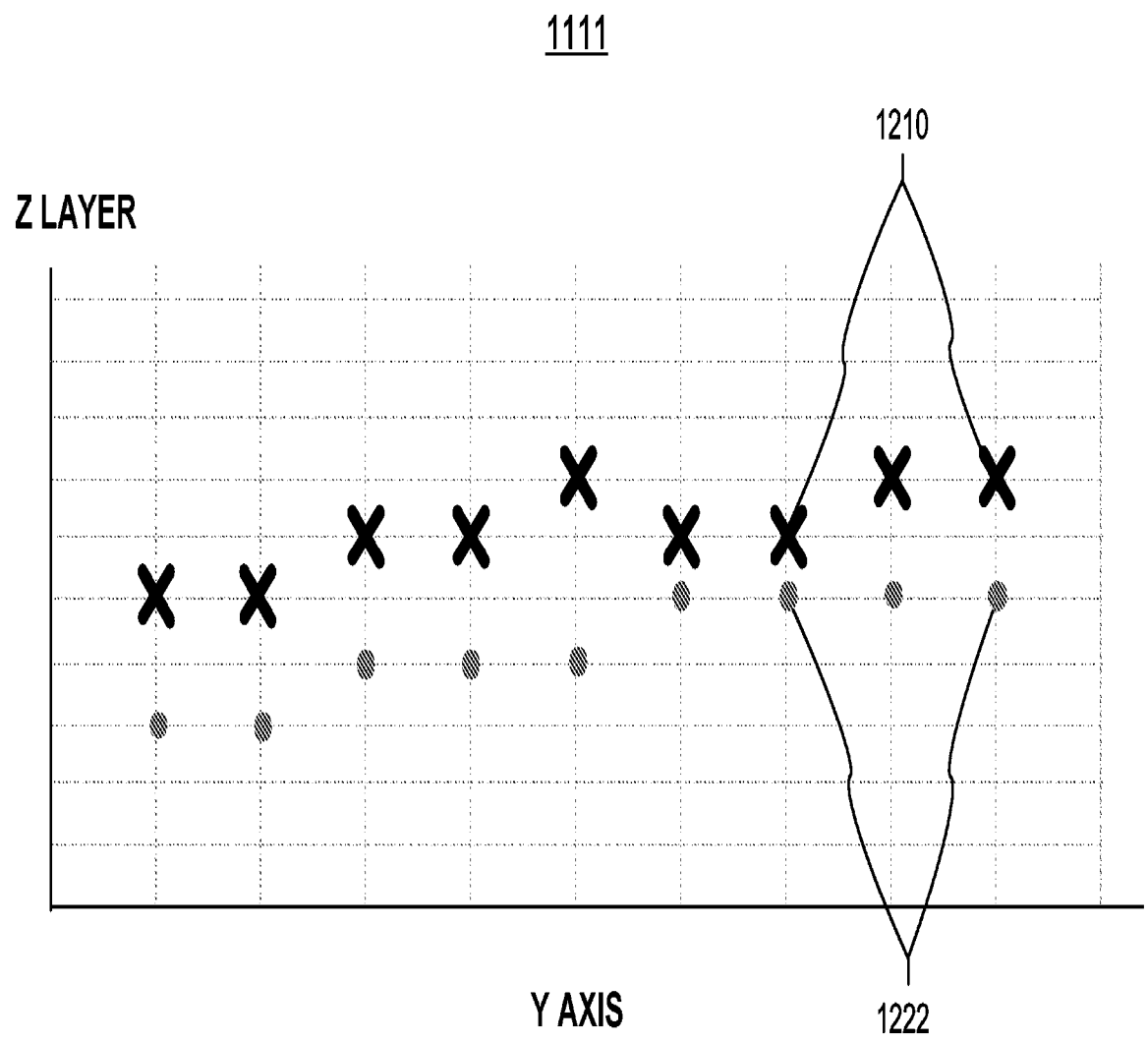
FIG. 12 is an enlarged view of an exemplary layer of the x,y,z array generated by the process of FIG. 11, showing two sets of best focus points for gray scale and red color.

FIG. 12 illustrates an exemplary array 1111 that shows the best focus points for gray-scale (black Xs) 1210 and the best focus points for one of the colors of interest (red dots) 1222 might differ in z for a set of grid points which vary in y, for a fixed x. The vertical axis is labeled "z layer", and corresponds to the values of z at which images for a Z-stack are captured. The horizontal axis is labeled "y", and corresponds to the distance along the length of the slide 117 for a fixed x along the width of the slide 117.

It should be noted that in this example, the distance in z between the black Xs 1210 and the red dots 1222 is mostly 2 layers, but is more than 2 layers at one y value, and less than 2 at two other y values. This variation is typical in the "real world". Since the grid points are, for example, a few mm apart, a scanning trajectory must be computed for the black Xs 1210 and another for the red dots 1222 so that the focus mechanism (comprised of the lens assembly 530) can be continuously controlled during the scan.

In one embodiment, the digital imaging system 110 determines a smooth trajectory for the gray-scale (black Xs) 1210 first, and then any additional trajectories that are justified by the analysis of best focus for the colors of interest 1222. The additional trajectories might follow the red dots closely. In another embodiment, the additional trajectories might be constrained to always be either above or below the black Xs 1210. In yet another embodiment, the additional trajectories might be constrained to be always parallel to the gray-scale trajectory by a predetermined fixed distance in z. In still another embodiment, the additional trajectories might be further constrained by a model of the chromatic aberration of the lenses 115, which might be generated during a pre-scan calibration step or might be based on a physical model of the lenses 115. A calibration step might use the slide 117 with artificial targets of different colors, or a specimen slide where all relevant biomarkers and colors are present.

However, in one exemplary embodiment of the present disclosure, the calibration step is not required. When the individual stains present in the slide 117 are known, then by the physical property of the stains, the depth of focus of these stains can be roughly estimated from the knowledge that longer wavelengths of light come to a focus farther from the lenses 115 than do shorter ones. Hence, when there are three stains, e.g. red, black, and blue, then using the prior knowledge of the stain colors, it is possible to know in advance which stain will occupy higher z values, and which stains will occupy lower z values. Such knowledge provides an a-priori estimate of the best focused z layer for each stain, with respect to the best focused layer for gray scale image. In a given tissue, when the stain variation is such that this initial assumption about different depths of focus of the different stains is violated, then the prior knowledge based pre-calibration may not work. Otherwise, for most practical scenarios, the relative position of the different scan trajectories, for each individual stain, can be estimated beforehand.

The foregoing trajectories determining methods can be extended to one or more other colors of interest, as needed. If the distance in z between the gray scale and a color of interest is nearly always zero, then no additional trajectory is needed. If it is nearly always equal to 1 or greater, then an additional trajectory for that color of interest, will provide an additional digitized image of the whole specimen 710 may be beneficial to the pathologist.

For RGB cameras capturing images of transmitted (approximately white) light, only one additional scan trajectory may be needed, depending on the color distribution of the biological features of interest. For cameras capturing images at sequential multiple narrow color bands generated by colored filters, colored light sources, or fluorescent specimens, more than one additional scan trajectory may be required for satisfactory focusing of all colors present in the slide image.

Figure 13:
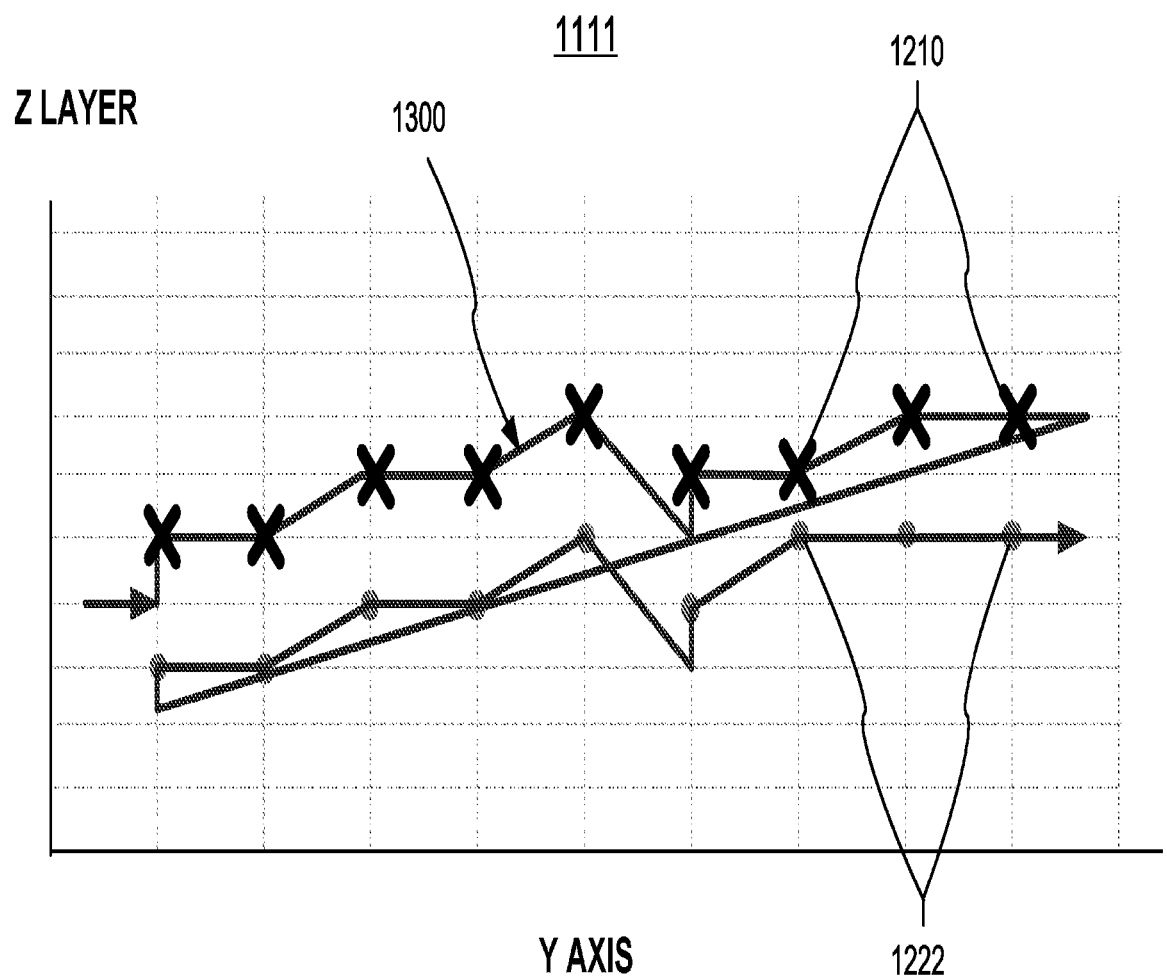
FIGS. 13, 14, 15, 16 illustrate exemplary, alternative individual scanning trajectories that are executed by the digital imaging system based on the x,y,z arrays of FIGS. 11 and 12, for each gray scale and color channel of interest, according to the present disclosure.

Once the best focus points 1210, 1222 have been determined, different trajectories (e.g., 1300, 1400, 1500, 1600, etc.) may be followed to position the slide 117 and focus the lenses 115 at these best focus points 1210, 1222. FIG. 13 illustrates a first exemplary complete trajectory 1300 that is executed for each color channel, and that sequentially joins the best focus points 1210 first and then the best focus points 1222. In order to increase the positioning accuracy, all positions are approached from the same direction (i.e., in increasing z-direction). This approach compensates for possible mechanical backlash in a system. The trajectory 1300 provides independent color channels, and an additional registration step is required to align independent color channels into one composite image.

Figure 14:
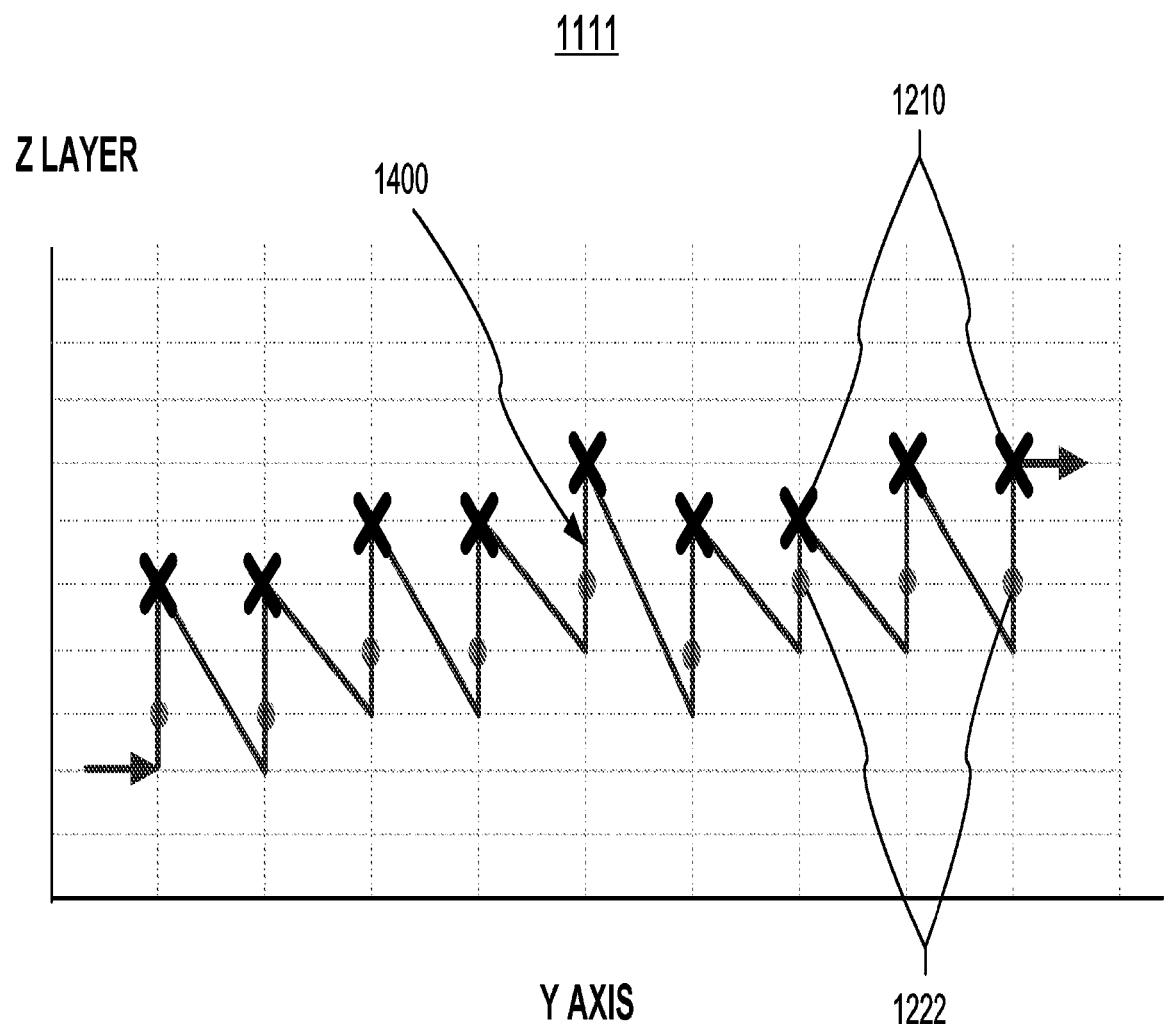

FIG. 14 illustrates another trajectory 1400 that is executed according to an "alternating layers" pattern. While the trajectory 1300 (FIG. 13) causes the slide 117 to be moved through the best focus trajectory for gray-scale, and thereafter through the best focus trajectory for red (for example), and similarly for any other desired color trajectory, the trajectory 1400 is executed according to an alternating layers pattern. The scanner 200 alternates from one sub-trajectory (between two best focus points) to the next in z, as it moves the slide in x and y. This movement is controlled so that the images collected for each trajectory fully overlaps with each other, in order to ensure the full digitization of the specimen 710.

As the scan progresses in x,y, the best focus images for each color channel are captured at each x,y, which may prove to require less scanning time. The advantage of the approach illustrated in FIG. 14 is that it requires the slide 117 to move only once over the range of x and y necessary for digitization of the specimen 710, and the acquired image data is always spatially aligned.

Figure 15:
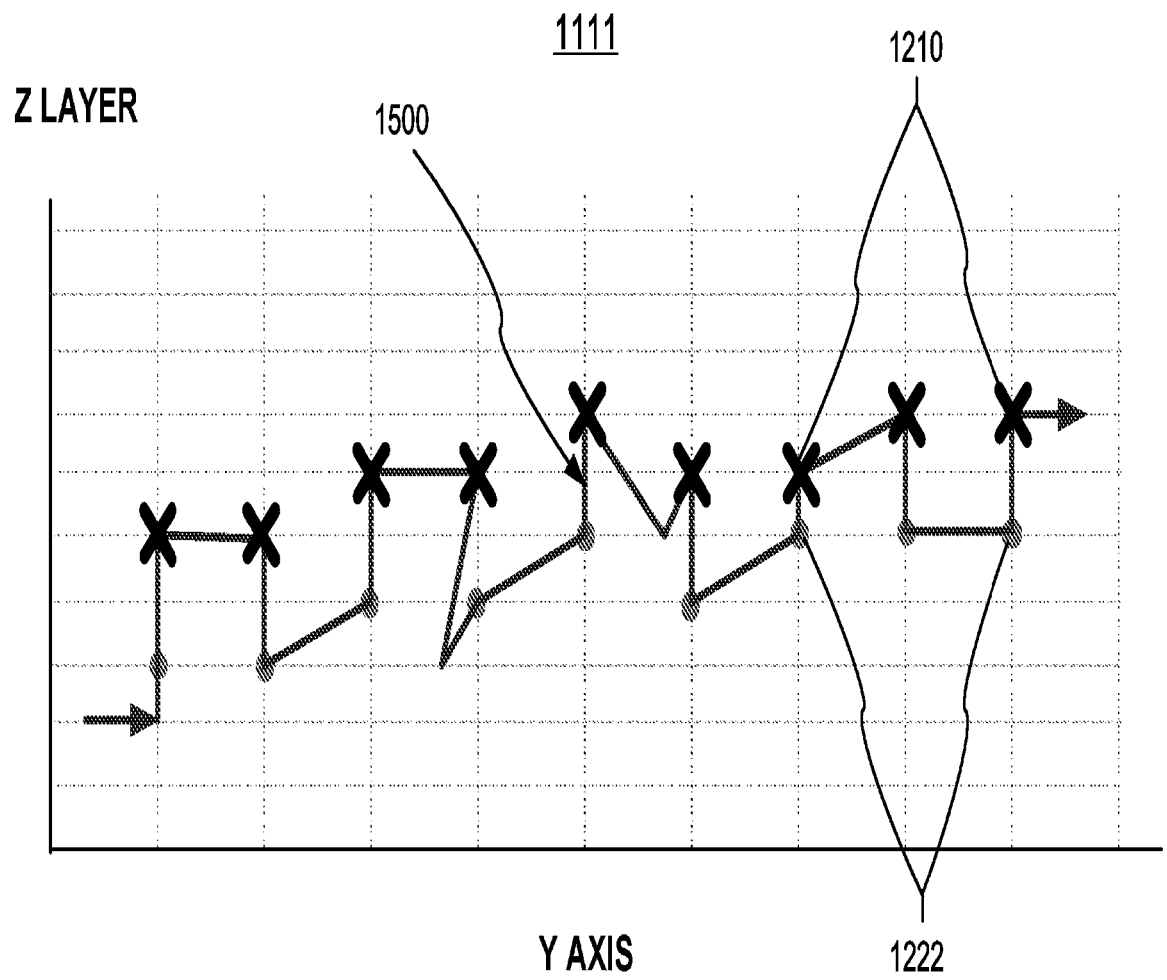

FIG. 15 illustrates another exemplary alternating trajectory 1500 with reduced total scanning motion. Along the trajectory 1500, the order of acquired image channel at each slide position is chosen such that the closest position in z is imaged first. The resulting multiple images are then fused into a single image by a compositing technique and analyzed, or they are first individually analyzed and the results then fused into a composite analysis.

Figure 16:
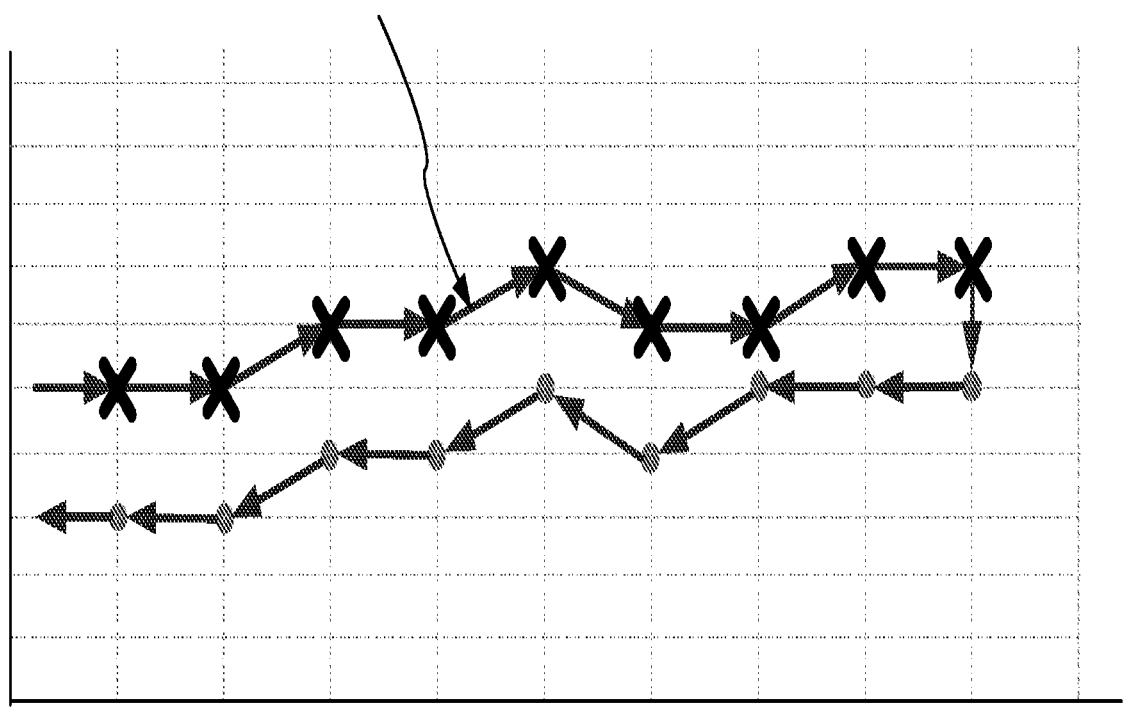

FIG. 16 illustrates yet another possible trajectory 1600 according to the present disclosure. It should be understood that the trajectories 1300, 1400, 1500, 1600 are non exclusive examples and are provided herein for illustration purpose.

In each of the flow charts described herein, one or more of the methods may be embodied in a computer readable medium containing computer readable code such that a series of steps are performed when the computer readable code is executed on a computing device. In some implementations, certain steps of the methods are combined, performed simultaneously or in a different order, or perhaps omitted, without deviating from the spirit and scope of the disclosure. Thus, while the method steps are described and illustrated in a particular sequence, the use of a specific sequence of steps is not meant to imply any limitations on the disclosure. Changes may be made with regards to the sequence of steps without departing from the spirit or scope of the present disclosure. The use of a particular sequence is therefore, not to be taken in a limiting sense, and the scope of the present disclosure is defined only by the appended claims.

As it will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

As it will be further appreciated, the processes in embodiments of the present disclosure may be implemented using any combination of software, firmware or hardware. As a preparatory step to practicing the disclosure in software, the programming code (whether software or firmware) will typically be stored in one or more computer readable storage mediums for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the disclosure may be practiced by combining one or more machine-readable storage devices containing the code according to the present disclosure with appropriate processing hardware to execute the code contained therein. An apparatus for practicing the disclosure could be one or more processing devices and storage systems containing or having network access to program(s) coded in accordance with the disclosure.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, R.F, etc., or any suitable combination of the foregoing. Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Thus, it is important that while illustrative embodiments of the present disclosure are described in the context of a fully functional computer (server) system with installed (or executed) software, those skilled in the art will appreciate that the software aspects of the illustrative embodiments of the present disclosure are capable of being distributed as a program product in a variety of forms, and that an illustrative embodiment of the present disclosure applies equally regardless of the particular type of media used to actually carry out the distribution.

In addition, while the present disclosure has been described with reference to exemplary embodiments, it will be understood by those skilled in the art that various changes may be made and equivalents may be substituted for elements thereof without departing from the scope of the disclosure. Furthermore, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims.

It is to be understood that the phraseology and terminology used herein with reference to device, mechanism, system, or element orientation (e.g., x,y,z directions), is for the purpose of describing particular embodiments only and is not intended to be limiting of the disclosure. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Moreover, the use of the terms first, second, etc. do not denote any order or importance, but rather the terms first, second, etc. are used to distinguish one element from another. In addition, listing terms such as "a", "b", c", "first", "second", and "third" are used herein and in the appended claims for purposes of description and are not intended to indicate or imply relative importance or significance.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A method for acquiring focused images of a specimen on a slide, by determining optimal scanning trajectories, the method comprising:
    capturing a relatively low magnification image of the slide to locate the specimen;
    forming a grid that includes an arrangement of grid points;
    overlaying at least part of the grid over a field of view that covers at least part of the specimen;
    for each grid point within the at least part of the grid:
        capturing a set of Z-stack images that correspond to the grid point;
        computing an average gradient value for one or more image features of each image of the set of Z-stack images;
        selecting an image from the set of Z-stack images having a greatest average gradient value; and
        processing the image having the greatest average gradient value to generate a focus value corresponding to the grid point
    using the focus value of each grid point within the at least part of the grid to form a resulting grid of three dimensional points; and
    based on the resulting grid, determining one or more three dimensional scanning trajectories.

2. The method of claim 1, wherein processing the image having the greatest average gradient value to generate the focus value corresponding to the grid point further includes discarding the set of Z-stack images following the generation of the focus value corresponding to the grid point.

3. The method of claim 1, wherein the grid is formed in a two-dimensional plane; and
    wherein capturing the set of Z-stack images includes using an optical beam that is perpendicular to the two-dimensional plane.

4. The method of claim 1, further comprising:
    capturing a focused image of a part of the specimen corresponding to each of the one or more three dimensional scanning trajectories; and
    stitching the focused images of the parts of the specimen to obtain a composite image of an entire specimen.

5. The method of claim 3, wherein the grid includes an even arrangement of grid points.

6. The method of claim 3, wherein the grid includes an irregular arrangement of grid points.

7. The method of claim 3, wherein said one or more three dimensional scanning trajectories include multi-spectral trajectories.

8. The method of claim 7, wherein computing an average gradient value for each image of the set of Z-stack images comprises determining the average gradient value for each Z-value corresponding to grayscale and each color of interest of the grid point.

9. The method of claim 8, further including remotely accessing and displaying any one or more of a gray-scale image, images of colors of interest, and/or a composite image of an entire specimen.

10. A system for acquiring focused images of a specimen on a slide, by determining optimal scanning trajectories, the system comprising:
    a digital imager that captures a relatively low magnification image of the slide to locate the specimen; and
    a digital imaging system that:
        forms a grid comprised of an arrangement of grid points;
        overlays at least part of the grid over a field of view that covers at least part of the specimen;
        for each grid point within the at least part of the grid:
            receives, from the digital imager, a set of Z-stack images that correspond to the grid point;
            computes an average gradient value for one or more image features of each image of the set of Z-stack images;
            selects an image from the set of Z-stack images having a greatest average gradient value; and
            processes the image having the greatest average gradient value to generate a focus value corresponding to the grid point;
        uses the focus value of each grid point within the at least part of the grid to form a resulting grid of three dimensional points; and
        based on the resulting grid, determines one or more three dimensional scanning trajectories.

11. The system of claim 10, wherein the digital imaging system discards the set of Z-stack images following the generation of the focus value corresponding to the grid point.

12. The system of claim 11, wherein computing an average gradient value for each image of the set of Z-stack images comprises determining the average gradient value for each Z-value corresponding to grayscale and each color of interest of the grid point.

13. The system of claim 11, further including a user station that remotely accesses and displays any one or more of a gray-scale image, images of colors of interest, and/or a composite image of an entire specimen.

14. A non-transitory computer-readable medium storing instructions which, when executed by one or more processors, cause a system for acquiring focused images of a specimen on a slide to perform operations comprising:

instructing a digital imager to capture a relatively low magnification image of the slide, in order to locate the specimen;

forming a grid comprised of an arrangement of grid points; overlaying at least part of the grid over a field of view that covers at least part of the specimen;

for each grid point of the at least part of the grid:
  receiving, from the digital imager, a set of Z-stack images that correspond to the grid point;
  computing an average gradient value for one or more image features of each image of the set of Z-stack images;
  selecting an image from the set of Z-stack images having a greatest average gradient value; and
  processing the image having the greatest average gradient value to generate a focus value corresponding to the grid point using the focus value of each grid point within the at least part of the grid to form a resulting grid of three dimensional points; and based on the resulting grid, determining one or more three dimensional scanning trajectories.

15. The non-transitory computer-readable medium of claim 14, wherein the operation to process the image having the greatest average gradient value to generate the focus value corresponding to the grid point further comprises discarding the set of Z-stack images following the generation of the focus value corresponding to the grid point.

16. The non-transitory computer-readable medium of claim 15, wherein computing an average gradient value for each image of the set of Z-stack images comprises determining the average gradient value for each Z-value corresponding to grayscale and each color of interest of the grid point.

17. The non-transitory computer-readable medium of claim 15, wherein the operations further comprise enabling a remotely located user station to access and display any one or more of a gray-scale image, images of colors of interest, and/or a composite image of an entire specimen.

18. The method of claim 1, wherein the one or more image features correspond to a gray-scale color channel corresponding to the image of the set of Z-stack images.

19. The method of claim 1, wherein the one or more image features correspond to a plurality of color channels corresponding to the image of the set of Z-stack images.

20. The non-transitory computer-readable medium of claim 14, wherein the operations further comprise:
  capturing a focused image of a part of the specimen corresponding to each of the one or more three dimensional scanning trajectories; and
  stitching the focused images of the parts of the specimen to obtain a composite image of an entire specimen.

* * * * *